April 11, 1944.　　　F. B. PEEBLES　　　2,346,388
GATE DRIVE
Filed April 8, 1942　　　2 Sheets-Sheet 1
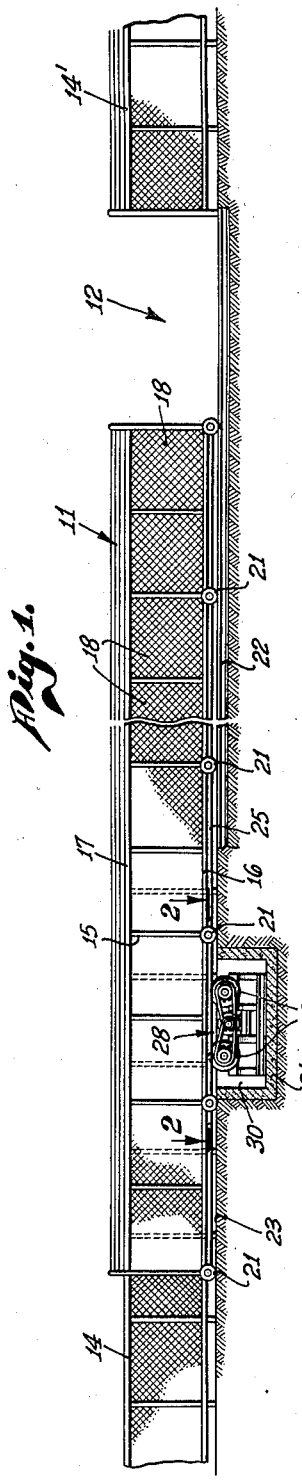
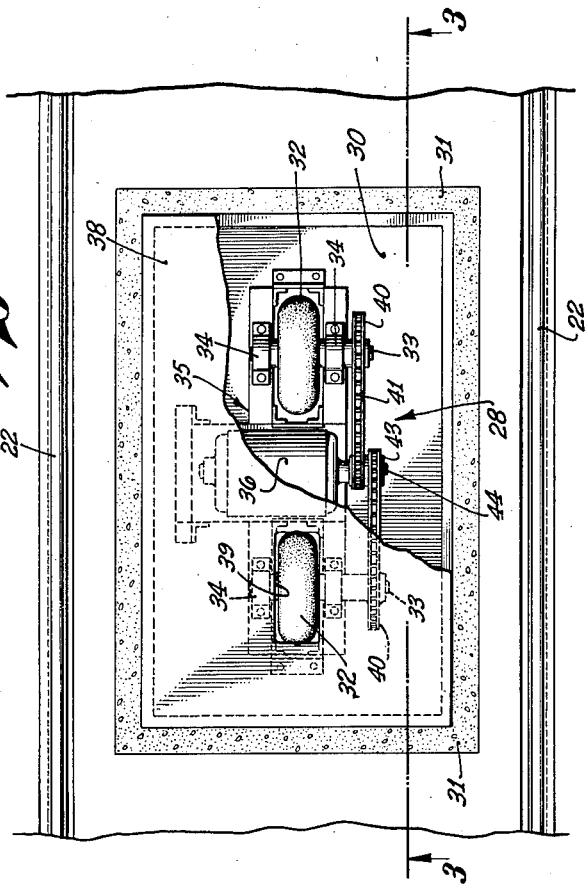
FRANK B. PEEBLES,
INVENTOR.
BY Frank L. A. Graham
ATTORNEY.

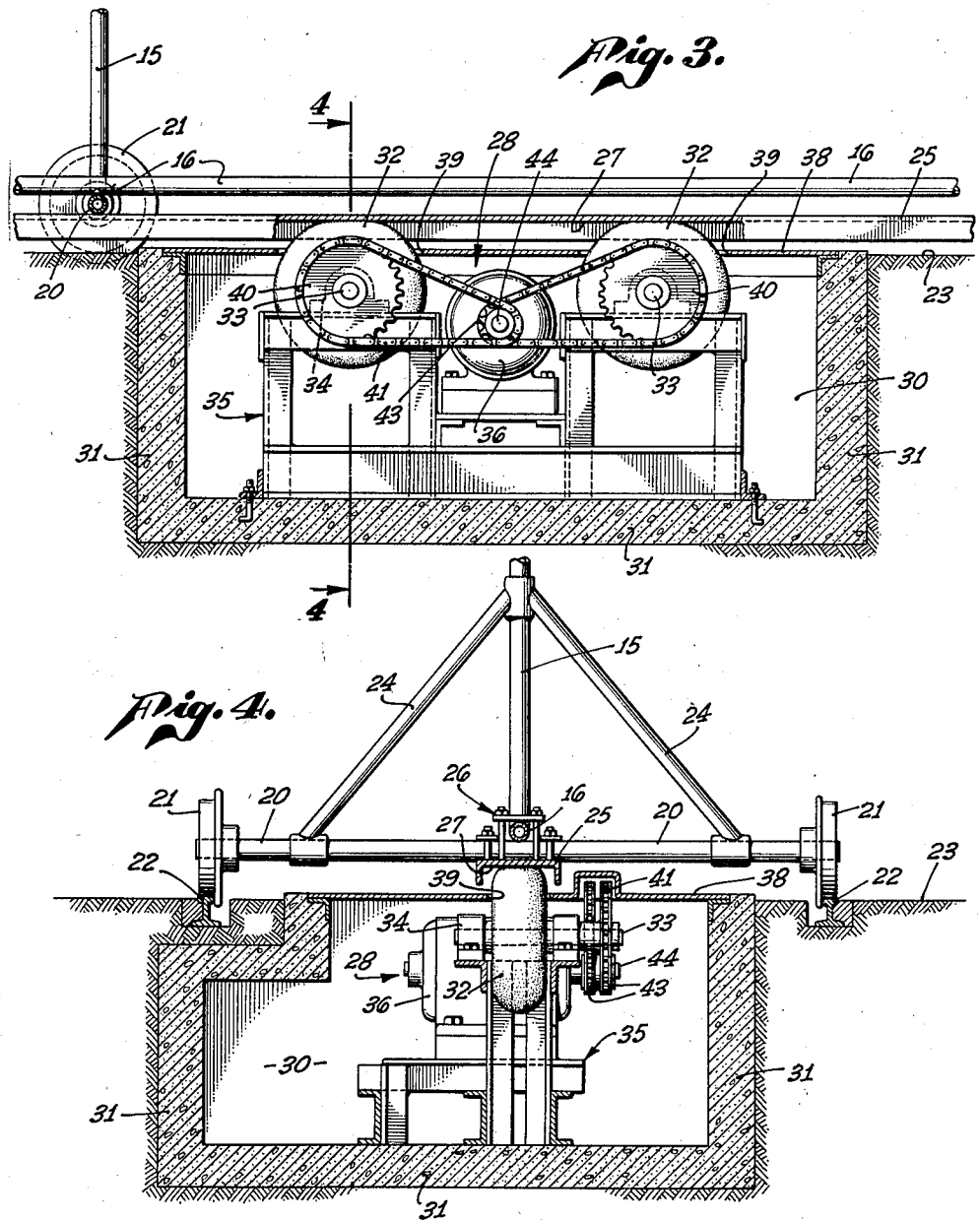

Patented Apr. 11, 1944

2,346,388

UNITED STATES PATENT OFFICE 2,346,388

GATE DRIVE

Frank B. Peebles, Los Angeles, Calif., assignor to Irving G. King & Company, a partnership Application April 8, 1942, Serial No. 438,067

3 Claims. (Cl. 39—7)

This invention relates generally to means for opening and closing so-called sliding doors and gates which are movable edgewise to close an opening.

There are many instances where large, heavy sliding doors are used in factories, warehouses and other buildings and other instances where extremely long gates are used which are mounted for edgewise movement. An example of the latter is the installation of such gates in fences around aircraft factories and the like where, of necessity, the gate opening must be very large to accommodate the passage therethrough of the large modern airplanes having great wingspread. Usually such doors and gates are mounted on wheels or suspended from overhead tracks. The large gates and doors are especially difficult to move manually even where such anti-friction means are used to support their weight. Various types of means have been devised for operating the gates and doors by electric or other power, but such means as I am familiar with entail objectionable features and disadvantages. Some require a rack and pinion drive and others make use of a cable and pulley means. These installations are expensive, unsightly and dirty due to the necessity for keeping the working parts lubricated. Another disadvantage is the fact that the gate or door drive parts can be disconnected or broken to permit movement of the door or gate by unauthorized persons.

It therefore is a primary object of my invention to provide a new and improved means for operating sliding doors and gates of the type which move edgewise. In this connection it is a particular object to provide means which can be almost entirely hidden from sight and will therefore not entail any exposed unsightly or dangerous parts. It is also an object to provide a drive means which acts as a lock to prevent unauthorized manipulation of the gate manually.

It is a particular object of my invention to provide a drive means for resilient engagement with a traction surface on a door or gate for opening and closing the door or gate. In this respect it is a particular object to provide one or more drive wheels provided with a resilient peripheral portion adapted to engage a traction surface on the gate and to mount these wheels sufficiently close to the gate so that their peripheral portions will be deformed against the traction surface.

In the drawings and description thereof I have shown one form of the invention for use in operating a particular type of gate. It is contemplated, however, that various types of structures may be operated by the apparatus of my invention, such as sliding doors for one example, and it is not intended to limit the invention for use in the operation of gates nor to the exact form of the apparatus shown and described.

In addition to the above mentioned objects, others will be apparent from the drawings and the following description thereof. Referring to the drawings which are for illustrative purposes only;

Fig. 1 is an elevational view of a gate and portion of a fence together with means for operating the gate, the view being largely diagrammatic;

Fig. 2 is an enlarged plan view of the gate driving mechanism taken on line 2—2 of Fig. 1;

Fig. 3 is a sectional elevation through the pit showing the gate driving mechanism in elevation and showing a fragmentary portion of the gate;

Fig. 4 is a cross section on line 4—4 of Fig. 3;

Fig. 5 is an enlarged fragmentary section in the same plane as Fig. 4 showing one form of drive wheel in engagement with the traction surface on the gate.

More particularly describing the invention, reference numeral 11 generally indicates a gate adapted for closing the opening 12 between the sections of fence 14—14'. The gate may be constructed in any suitable manner and as diagrammatically shown in Fig. 1 comprises tubular structural elements 15, 16 and 17 supporting interlaced wire 18. As more clearly shown in Fig. 4, this gate is provided with cross bars 20 secured to the main portion of the gate at the lower edge thereof. These cross bars 20 serve as axles to accommodate flanged wheels 21 adapted to run on rails 22. In the form of the invention shown, the rails are sunken, the tops of the rails being flush with the ground level indicated at 23. Diagonal braces 24 can be employed to stabilize the gate.

The lower edge of the gate is provided with an inverted channel member 25 which is secured to the gate by suitable bolts and plates generally indicated at 26. This channel member forms an elongate traction surface 27 which, as will subsequently appear, is adapted to be frictionally engaged by one or more drive wheels for operating the gate.

The gate itself is preferably made longer than the opening 12 in the fence so that when the gate is closed there will remain a portion of the gate which occupies an overlapping relation with the fence. With this construction it is possible to locate the gate drive means, generally indicated by numeral 28, beyond the opening in the gate. The gate may be located in the same plane as the fence section 14' if desired, but will necessarily have to be located to one side of the plane of the fence section 14. This latter section can be provided with a short fence section at its end extending toward the gate at right angles to the main section but constructed to provide clearance for the wheels 21, cross bars 20 and braces 24. Or a small gate might be used at this point.

The gate drive means 28 is preferably located below the surface of the ground so that it is almost entirely contained within a pit 30. The pit itself may be lined with concrete 31 and provided with suitable drainage facilities as the particular installation may require. No drainage means has been shown since it forms no part of the invention. Reference is made particularly to Figs. 2 to 5 for a more detailed disclosure of the gate drive means.

In the form of the invention shown two gate drive wheels 32 are shown rotatably mounted in the same plane on axes which extend at right angles to the longitudinal axis of the channel member 25 or traction surface 27. These wheels are mounted on axles 33 which are journalled in bearings 34 mounted on a suitable base or supporting framework generally indicated by numeral 35. Also mounted on the base or supporting framework 35 is a suitable electric motor 36. The motor is shown mounted between the wheels and lower on the supporting framework so that it is entirely contained within the pit 30. On the other hand, the wheels being mounted nearer the top of the pit on the framework 35 have their upper portions extending above the top of the pit and above the level of the ground. The pit is provided with a cover plate 38 which is provided with a pair of openings 39 to permit the upper portions of the drive wheels to extend therethrough. One of such openings is indicated at 39 in Figs. 2 and 4.

At one end the drive wheel axles 33 are provided with sprocket wheels 40 adapted to accommodate drive chains 41 which pass around the respective driving sprockets 43 on the motor shaft 44. This chain drive means results in the driving of both wheels simultaneously in the same direction of rotation. The motor is a reversing electric motor which can be connected to a suitable source of electric energy in any well known manner and provided with suitable electric control means at any desired location. It is contemplated that other motive power and drive means can be provided for operating the wheels without departing from the scope of the invention.

As indicated, the drive wheels are mounted on axes which extend at right angles to the longitudinal axis of the traction surface on the gate. These drive wheels are provided with a resilient peripheral portion for engagement with the traction surface 27. The axes of the respective wheels are located with respect to the traction surface 27 at a distance less than the normal radius of the wheel, whereby the resilient peripheral portion of the wheel will be deformed against such traction surface and thereby insure maximum frictional engagement with the traction surface. One form of construction of the drive wheels is indicated in Fig. 5 wherein there is shown a drive wheel 32 comprising a steel wheel portion 45 accommodating an airless or non-inflatable tire 46. As clearly shown in Fig. 5 the periphery of the tire is substantially deformed against the traction surface 27, the weight of the gate being sufficient to overcome the tendency of the tire to assume its normal shape.

The tire shown, of the non-inflatable, or airless type, has been found suitable in practice and has the advantage of not requiring attention. Such tires are pre-stressed by being turned inside out after the tire is formed. It is contemplated that various types of flexible or resilient tires can be successfully used, such as pneumatic tires either with or without tubes and even solid tires of sufficient resiliency.

In operation the motor is started to drive the wheels, which, from their frictional engagement with the traction surface of the gate, serve to move the gate in a desired direction. Reversal of the motor of course affects the movement of the gate in the opposite direction. The channel 25 in addition to acting as a means forming a traction surface for the drive wheels also serves as a shield covering the exposed portions of the traction wheels and extending laterally beyond the openings 39 in the cover.

As suggested before, it is contemplated that the invention is useful for operating large objects which can conveniently be provided with or which already have an elongate traction surface for engagement of one or more drive wheels. It is not necessary, however, that the drive wheels and the traction surface be located at the lower edge of the door as shown, gate or member to be operated. It is apparent that with the construction disclosed there is a minimum of exposed parts and that these are shielded or at least partially covered by the channel 25 of the gate thereby providing a safe and almost entirely concealed drive means.

Although the invention has been particularly shown and described it is contemplated that various changes and modifications can be made without departing from the scope of the invention and it is intended to cover such changes and modifications as come within the claims.

I claim as my invention:

1. In combination, a fence, a gate adapted to close an opening in the fence, means supporting said gate for edgewise movement to open or close said opening, said gate extending for a greater distance than the extent of said opening whereby when said gate is closed an end of said gate extends beyond said opening in overlapping relation to said fence, a pit beneath said gate adjacent to the opening in the fence in the region where the gate occupies an overlapping relation with the fence, means on said gate forming an elongate traction surface at the lower edge of the gate, a drive wheel mounted in said pit beneath said traction surface, said drive wheel being rotatable about an axis at right angles to the longitudinal axis of said surface, said wheel being provided with a resilient peripheral portion and being positioned to have such portion deformed into frictional engagement with said traction surface, a motor in said pit for operating said wheel, and a cover for said pit, said cover having an opening to receive the upper portion of said wheel.

2. In combination, a fence, a gate adapted to close an opening in the fence, means supporting said gate for edgewise movement to open and close said opening, said gate extending for a greater distance than the extent of said opening whereby when said gate is closed an end of said gate extends beyond said opening in overlapping relation to said fence, an inverted channel extending along the lower edge of said gate providing an elongate traction surface extending in the direction of movement of the gate, a pit beneath said gate adjacent to the opening in the fence in the region where the gate occupies an overlapping relation with the fence, a drive wheel mounted in said pit beneath said traction surface, said drive wheel being rotatable about an axis at right angles to the longitudinal axis of said channel, said wheel being provided with a resilient peripheral portion and being positioned to have such portion deformed into frictional engagement with said traction surface, a motor in said pit for operating said wheel, and a cover for said pit, said cover having an opening to receive the upper portion of said wheel, said channel extending laterally beyond the wheel and opening in said cover whereby it serves as a shield for the wheel and said opening.

3. In combination: a gate adapted to close an opening between structures; means supporting said gate for edgewise movement to open or close said opening, said gate extending for a greater distance than the extent of said opening whereby when said gate is closed an end of the gate extends beyond said opening in overlapping relation to one of said strctures; a pit beneath said gate adjacent to the opening between said structures in the region where the gate occupies an overlapping relation to one of said structures; means on the lower edge of said gate forming an elongate traction surface at the lower edge of the gate, a drive wheel mounted in said pit beneath said traction surface, said drive wheel being rotatable about an axis at right angles to the longitudinal axis of said surface, said wheel being provided with a resilient peripheral portion and being positioned to have such portion deformed into frictional engagement with said traction surface and a motor in said pit for operating said wheel.

FRANK B. PEEBLES.